(12) United States Patent
Ritchey

(10) Patent No.: US 6,481,381 B2
(45) Date of Patent: *Nov. 19, 2002

(54) PET-PLAY APPARATUS CONFIGURED FOR INTERACTIVE USE

(75) Inventor: Sharon A. Ritchey, Phoenix, AZ (US)

(73) Assignee: Cats with an Attitude, Inc., Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/951,942

(22) Filed: Sep. 10, 2001

(65) Prior Publication Data

US 2002/0017249 A1 Feb. 14, 2002

Related U.S. Application Data

(63) Continuation-in-part of application No. 09/531,708, filed on Mar. 21, 2000, now Pat. No. 6,378,464.

(51) Int. Cl.[7] ............................................. A01K 29/00
(52) U.S. Cl. ...................................................... 119/708
(58) Field of Search ................................ 119/702, 707, 119/708, 709

(56) References Cited

U.S. PATENT DOCUMENTS

| | | | |
|---|---|---|---|
| 284,351 A | 9/1883 | Arnold | 231/5 |
| 369,015 A | 8/1887 | Knapp | 231/5 |
| D38,325 S | 11/1906 | Timmins | D21/567 |
| 4,499,855 A | * 2/1985 | Galkiewicz | 119/708 |
| 4,517,922 A | 5/1985 | Lind | 119/29 |
| 4,577,590 A | 3/1986 | Skroch | 119/29 |
| 4,712,510 A | 12/1987 | Tae-Ho | 119/29 |
| 4,770,123 A | 9/1988 | Bell | 119/29 |
| 4,863,095 A | 9/1989 | Crane | 231/2.1 |
| 4,930,448 A | 6/1990 | Robinson | 119/29 |
| 4,940,018 A | 7/1990 | Edling | 119/29 |
| D309,964 S | 8/1990 | Viner et al. | D30/160 |
| D318,150 S | 7/1991 | Eitel et al. | D30/156 |
| 5,314,369 A | 5/1994 | Gamble | 446/247 |
| 5,357,904 A | * 10/1994 | Takahashi et al. | 119/708 |
| 5,467,740 A | 11/1995 | Redwine | 119/707 |
| 5,639,020 A | 6/1997 | Yau | 231/2.1 |
| 5,682,838 A | * 11/1997 | Reich | 119/711 |
| 5,743,215 A | 4/1998 | Zeff | 119/708 |
| 5,755,184 A | 5/1998 | Neidenberger | 119/707 |
| 5,778,825 A | * 7/1998 | Krietzmen et al. | 119/708 |
| 5,782,207 A | 7/1998 | Goodham | 119/707 |
| 5,803,786 A | * 9/1998 | McCormick | 119/708 X |
| 5,829,391 A | 11/1998 | Krietzman et al. | 119/708 |
| 5,875,737 A | 3/1999 | Boshears | 119/706 |
| 5,924,387 A | 7/1999 | Schramer | 119/708 |
| 6,089,947 A | 7/2000 | Green | 446/268 |

OTHER PUBLICATIONS

R.C. Steele Wholesale Pet Supplies catalog: p. 4#H–W20–3369–Cat Charmer; Design Library.
Pet USA Catalog; p. 38 #21–JY20117—Tiny Teaser; Design Library.
R.C. Steele Wholesale Pet Equipment and Kennel Supplies; p. 5#V20–3145–Twisty Squirrel; Design Library.

* cited by examiner

Primary Examiner—Robert P. Swiatek
(74) Attorney, Agent, or Firm—Meschkow & Gresham, P.L.C.

(57) ABSTRACT

A pet-play apparatus (20) for interactive use with a domestic cat or other pet (24) incorporates a lash (26) made of a strip of fake fur (56) formed into a tube (42) with a nap (58) of the fake fur (56) upon an external surface (60) of the tube (42), a crop (22) coupled to a first end (32) of the lash (26), a toy (28) detachably coupled to a second end (36) of the lash (26), and a sonic device (86) coupled to the crop (22) and configured to produce a prey-sound for the domestic cat or other pet (24) in the form of a chirp or squeak in response to a movement of the crop (22). A first attachment device (62) is affixed to the second end (36) of the lash (26) and incorporates a hook part (70) of a hook-and-loop fastener (88). A second attachment device (64) is affixed to the toy (28) and incorporates a loop part (72) of the hook-and-loop fastener (88), the hook and loop parts (70,72) being detachably coupled to each other.

18 Claims, 9 Drawing Sheets

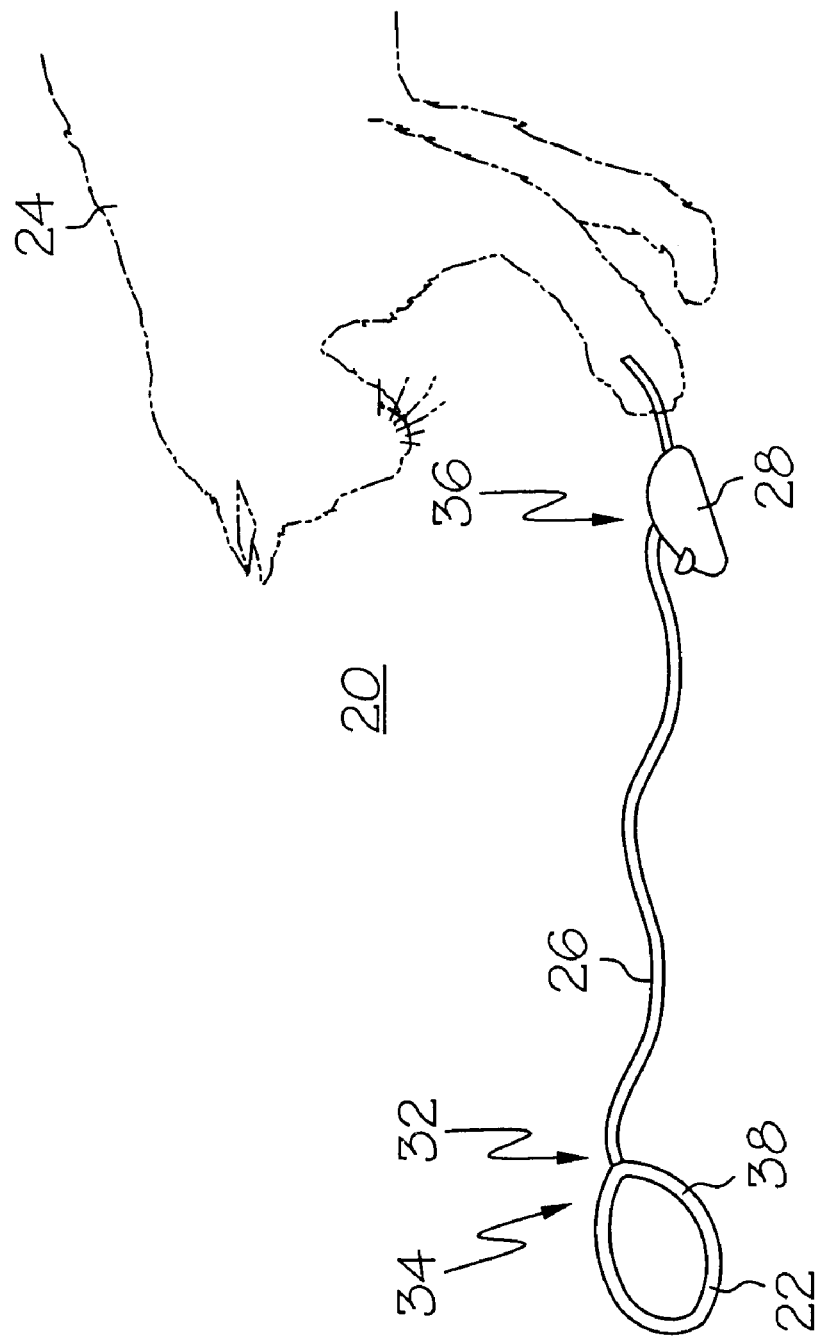

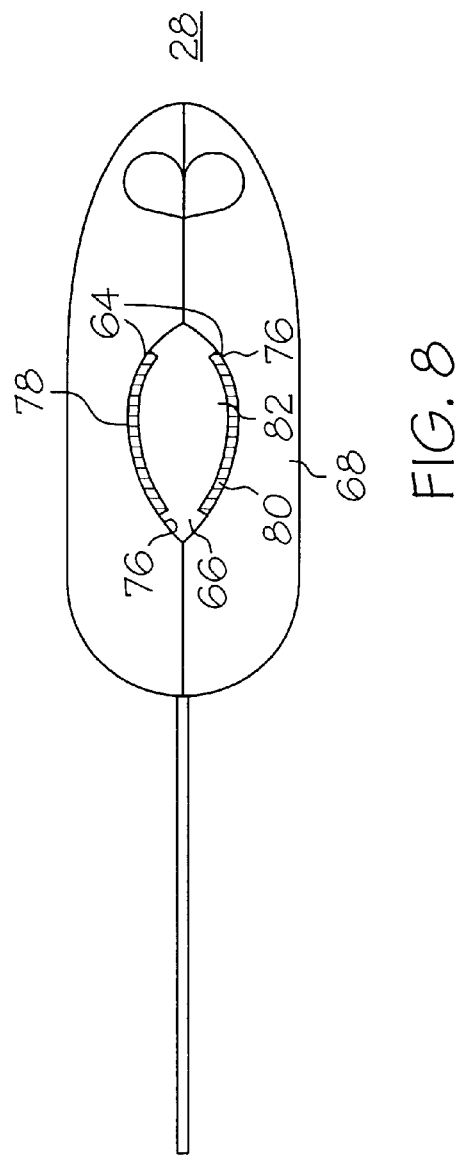
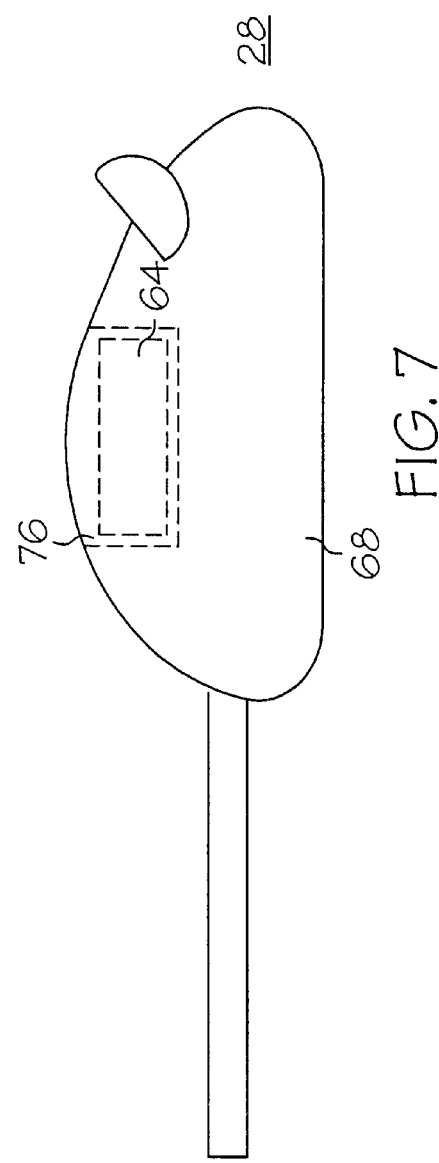

PET-PLAY APPARATUS CONFIGURED FOR INTERACTIVE USE

RELATED INVENTION

The present invention is a continuation in part (CIP) of "Pet-Play Apparatus Configured for Interactive And Solo Use," U.S. patent application Ser. No. 09/531,708, filed Mar. 21, 2000, now Pat. No. 6,378,464 which is incorporated by reference herein.

TECHNICAL FIELD OF THE INVENTION

The present invention relates to the field of pet toys. More specifically, the present invention relates to pet toys configured for interactive use between owner and pet.

BACKGROUND OF THE INVENTION

There are many pet-play apparatuses for interactive use between a pet and its owner utilizing a crop-lash-toy design approach. Pet-play apparatuses of this type stimulate the hunting and pouncing instincts and are most often used with small carnivorous pets, such as cats, ferrets, toy dogs, and the like.

Conventionally, such pet-play apparatuses are manufactured using string, twine, elastic cordage, monofilament line, picture wire, or other string-like materials as the lash. This poses several inherent dangers to the pet.

When a lash is formed of a string-like material, the pet may chew and ingest this material. Once ingested, this material can bind in the pet's intestines, resulting in intestinal distress, or even death. This is especially true of cats, which instinctively chew, sever, and ingest the lash.

Additionally, the chewing of some of these materials, especially monofilament line and picture wire, may chip or otherwise damage the pet's teeth, especially the carnassial teeth, may produce gomphiasis, and may lacerate the gingiva. All such conditions are injurious and/or unpleasant for the pet and potentially expensive for the owner.

Also, the pet may become entangled in the lash during play. This entanglement may cut off the flow of blood to a portion of the body or, if around the neck, may cut off the flow of air. A pet so entangled will typically panic, exacerbating the entanglement. If not freed, the pet may be strangled or risk permanent injury or death from loss of blood flow.

Many such pet-play apparatuses use an attachment device in the form of a clip, ring, or button to attach the lash to the suspended toy. This is especially true of those pet-play apparatuses where the toy is separable from the lash and may be used as an independent toy for solo use by the pet. In such an attachment device, the clip, ring, or button is often made of a hard plastic or metal.

Such devices may be bitten or chewed free or may simply break free during play. Furthermore, chewing of plastic devices may distort and break off pieces thereof, often leaving sharp edges and corners. Ingestion of these devices or portions thereof exposes the pet to several dangers. Choking may occur if the size, inflexibility, shape, and/or sharp edges of the object inhibit swallowing. Blockage, laceration, and/or perforation of the esophagus, stomach, or intestines may occur, especially if the object or object portion has sharp edges or points. Peritonitis may occur as a complication of perforation. Since many plastics and metals are either inherently toxic or produce toxic substances when exposed to acids (i.e., digestive fluids), poisoning is a distinct possibility. In addition, biting or chewing an attachment device formed of metal or hard plastic may chip or otherwise damage the pet's teeth, especially the laniary and carnassial teeth, may produce gomphiasis, and may lacerate the gingiva. All such conditions are unpleasant, injurious and/or possibly fatal to the pet. The correction of such conditions, where possible, is potentially expensive for the owner.

What is needed, therefore, is a pet-play apparatus of the crop-lash-toy type that is formed of materials that are not potentially injurious to the pet.

Many pets rapidly tire of the simple crop-lash-toy apparatus. It is therefore desirous that additional stimulation be provided. This additional stimulation extends the period of pet interest, thereby allowing for a more thorough workout for the pet and a marked increase in enjoyment for both the pet and the pet owner.

Also, pets often catch the toy of a conventional crop-lash-toy apparatus. When caught, the toy is subject to clawing and/or chewing, which markedly reduces the useful life of the toy. This is especially true of cats, as their natural instinct is to arrest movement of their prey through the use of their claws and teeth. It is therefore desirous that the toy be easily replaced without necessitating replacement of the entire apparatus.

SUMMARY OF THE INVENTION

Accordingly, it is an advantage of the present invention that a pet-play apparatus for interactive use with a pet is provided.

It is an advantage of one embodiment of the present invention that a pet-play apparatus is provided having a sonic device to stimulate use of the apparatus.

It is an advantage of one embodiment of the present invention that a pet-play apparatus is provided having a sonic device that emits sounds in response to movement.

It is an advantage of one embodiment of the present invention that a pet-play apparatus is provided having a sonic device that emits prey-sounds.

It is an advantage of one embodiment of the present invention that a pet-play apparatus is provided having a detachable toy.

It is another advantage of one embodiment of the present invention that a pet-play apparatus is provided having a lash that is formed of a fabric tube.

The above and other advantages of the present invention are carried out in one form by a pet-play apparatus for interactive use with a pet. Wherein the apparatus includes a crop, a sonic device coupled to the crop, a lash having a first end affixed to the crop and a second end, and a toy coupled to the second end of the lash.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 depicts a pet-play apparatus having a loop-shaped crop in interactive use in accordance with an alternative preferred embodiment of the present invention;

FIG. 7 depicts a side view of a the toy of FIG. 5 in accordance with a preferred embodiment of the present invention;

FIG. 8 depicts a top view of the toy of FIG. 5 showing an attachment device within an opening in accordance with a preferred embodiment of the present invention;

DETAILED DESCRIPTION OF THE PREFERRED EMBODIMENTS

Figure 1:
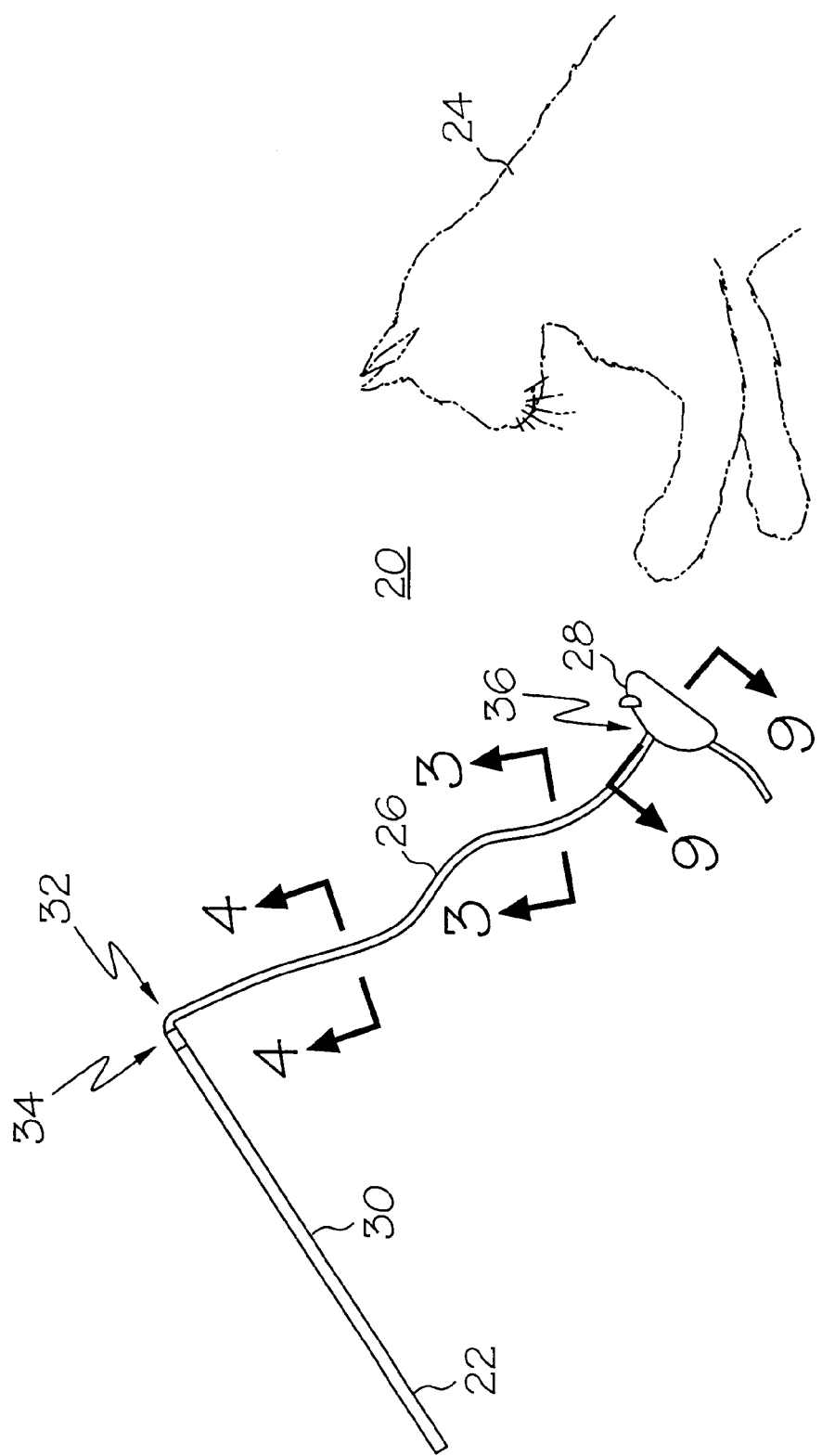
FIG. 1 depicts a pet-play apparatus having a wand-shaped crop in interactive use with a pet in accordance with a preferred embodiment of the present invention.

FIGS. 1 and 2 depict a pet-play apparatus 20 having a wand-shaped crop 22 (FIG. 1) or a loop-shaped crop 22 (FIG. 2) in interactive use with a pet 24 in accordance with a preferred embodiments of the present invention.

Pet-play apparatus 20 is a whip-type apparatus, which includes crop 22, a lash 26, and a toy 28. Crop 22 is typically a wand 30 (FIG. 1), allowing interactive use in a "fishing-pole" manner. One end (a crop end) 32 of lash 26 is affixed to an end 34 of crop 22. Toy 28 is suspended from and coupled to another end (a dangling end) 36 of lash 26. When crop 22 is held in an appropriate position, toy 28 may be made to dangle in front of pet 24. Suitable movements of crop 22 will cause toy 28 to bobble, bounce, wiggle, scoot across the floor, and otherwise move to attract the attention of pet 24. Toy 28 may therefore be made to move in a manner simulating prey. This stimulates the hunting and pouncing instincts of pet 24 and provides activity and play for both pet 24 and its playmate (i.e., the person in control of crop 22).

Alternatively, crop 22 may be formed into a loop 38 (FIG. 2) for interactive use in a dragging manner. While the movements of toy 28 may be reduced somewhat in this embodiment, other types of play are enhanced, including play by small children for whom wand 30 (FIG. 1) may be undesirable. This embodiment has an added benefit in that loop 38 may be placed over a protrusion (such as a doorknob) so as to leave toy 28 dangling and provide solo use by pet 24. Those skilled in the art will appreciate that loop 38 may be fabricated so as to be contiguous with lash 26 without departing from the spirit of the present invention. Lash 26 would desirably be formed of non-metallic and non-string-like materials resistant to being severed by chewing and formed to inhibit entanglement. Similarly, toy 28 would desirably be attached to lash 26 by a fastener or fasteners made of nonmetallic materials not assuming the form of a ring, clip, button or the like. Desirably, all such materials for either lash 26 or toy 28 would be non-toxic and would not produce toxic substances in the presence of digestive fluids. All such materials would be soft enough to not damage the teeth, gingiva, or other mouthparts of pet 24. Desirably, toy 28 should be readily detachable from lash 26 for independent (solo) use by pet 24, yet easily re-attachable for interactive use.

Figure 4:
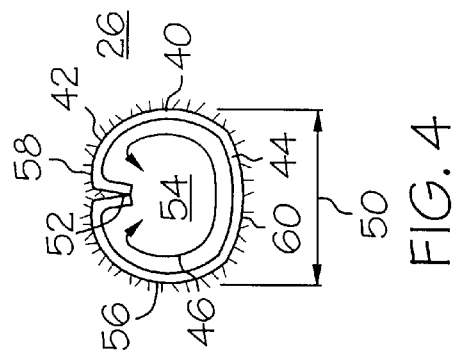
FIG. 4 depicts a cross-sectional view of a lash of the pet-play apparatus of FIG. 1 wherein the lash is a tube of fabric in accordance with a second preferred embodiment of the present invention.
Figure 3:
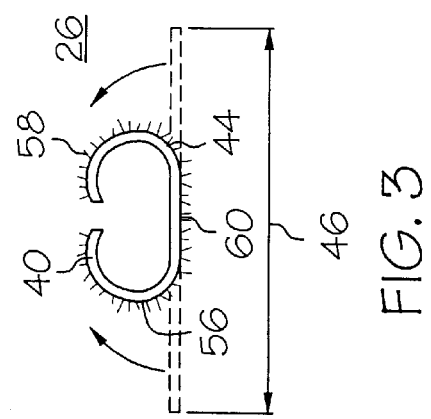
FIG. 3 depicts a cross-sectional view of a lash of the pet-play apparatus of FIG. 1 wherein the lash is a strip of fabric in accordance with a first preferred embodiment of the present invention.

FIGS. 3 and 4 depict a cross-sectional view of lash 26 of pet-play apparatus 20, wherein lash 26 is a strip 40 (FIG. 3) or a tube 42 (FIG. 4) of fabric 44 in accordance with preferred embodiments of the present invention. The following discussion refers to FIGS. 1, 3, and 4.

In a first preferred embodiment (FIG. 3), lash 26 is formed of strip 40 of fabric 44. Strip 40 has a width 46 and a length 48 (FIG. 6) substantially greater than width 46. Length 48 substantially defines an overall length of lash 26.

If cut across the warp, i.e., along the weft, of fabric 44, strip 40 will tend to curl in the direction of width 46 into a tube-like shape. This provides a thinner, more tail-like appearance for lash 26 than would be provided by a flat strip 40. This tail-like shape is more attractive to pet 24 while simultaneously increasing the life of lash 26 by inhibiting unraveling of fabric 44 when chewed by pet 24.

In a second preferred embodiment (FIG. 4), strip 40 is sewn into a tube 42 of a diameter 50 and length 48 (FIG. 6) substantially greater than diameter 50. For cosmetic purposes, tube 42 may be turned inside out (i.e., a sewn seam 52 may be placed on an inside 54 of tube 42). By being so formed, lash 26 has a more tail-like appearance and more effectively inhibits unraveling.

In the preferred embodiments, fabric 44 is a fake fur 56 with a nap 58 on the outside of the curl of strip 40 (FIG. 3) or on an external surface 60 of tube 42 (FIG. 4). This increases the tail-like appearance of lash 26.

Figure 5:
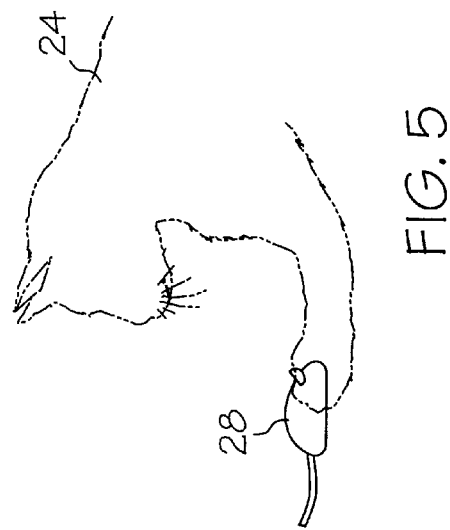
FIG. 5 depicts a toy detached from the pet-play apparatus of FIG. 1 in solo use by a pet in accordance with a preferred embodiment of the present invention.
Figure 6:
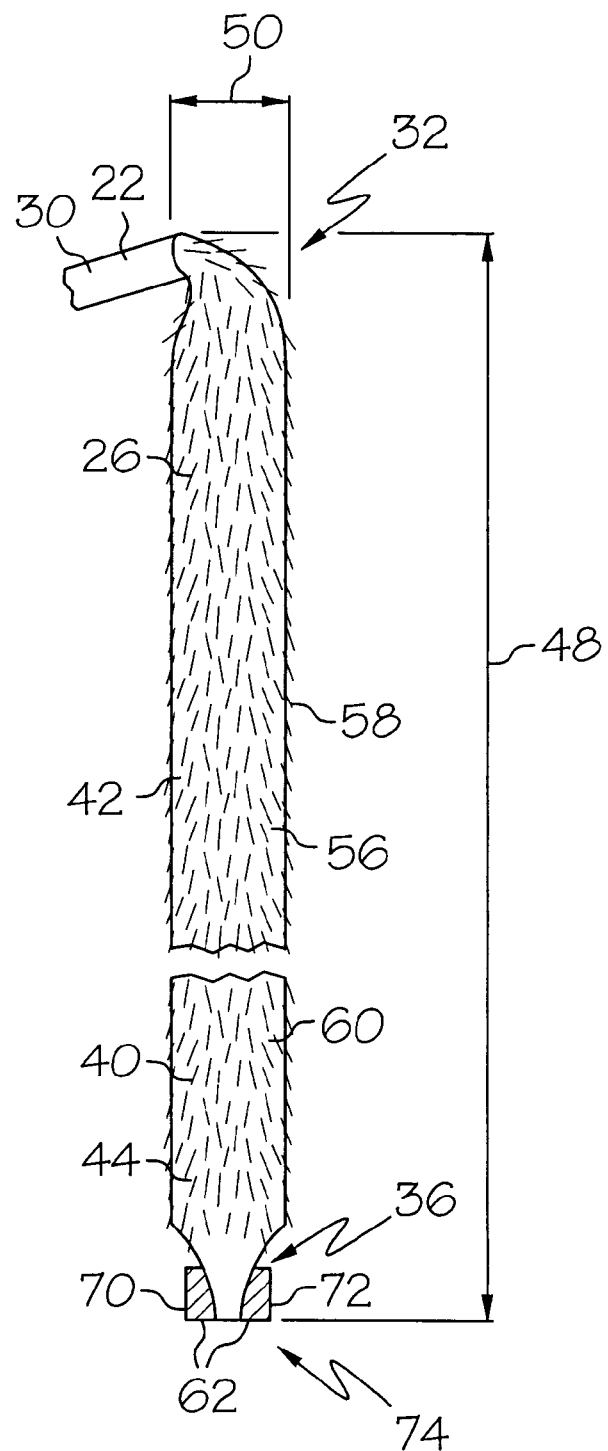
FIG. 6 depicts a side view of a portion of a lash of the pet-play apparatus of FIG. 1 showing an attachment device affixed to the lash in accordance with a preferred embodiment of the present invention.
Figure 9:
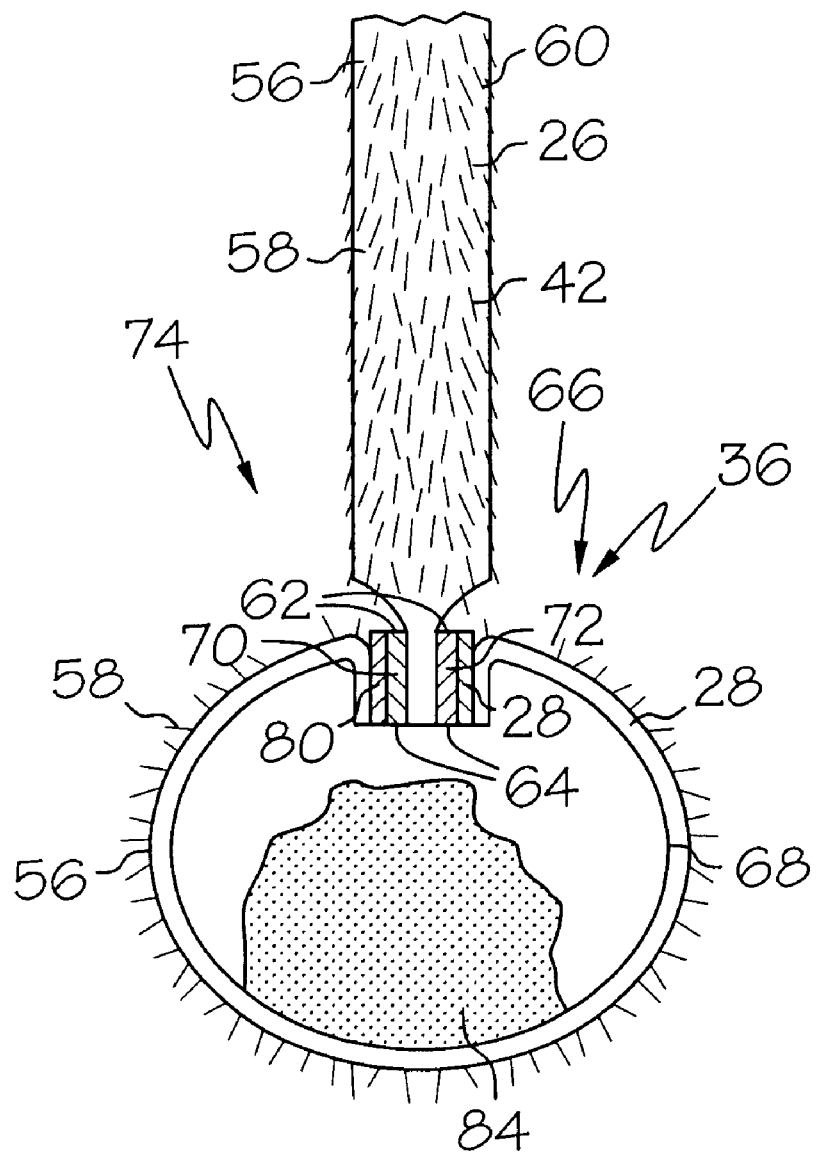
FIG. 9 shows a cross-sectional view depicting the lash coupled to the toy of the pet-play apparatus of FIG. 1 in accordance with a preferred embodiment of the present invention.

FIG. 5 depicts toy 28 detached from lash 26 in solo use by pet 24. FIG. 6 depicts a side view of a portion of lash 26 showing an attachment device 62 affixed to lash 26. FIG. 7 depicts a side view of toy 28 and FIG. 8 depicts a top view of toy 28 showing an attachment device 64 within an opening 66. FIG. 9 shows a cross-sectional view depicting lash 26 coupled to toy 28 in accordance with a preferred embodiment of the present invention. The following discussion refers to FIGS. 1, 2, and 5 through 9.

In the preferred embodiment, lash 26 detachably couples to toy 28 (i.e., toy 28 may be attached to or detached from lash 26 at will). This allows toy 28 to be a suspended toy (i.e., attached to lash 26) for interactive use with pet 24 (FIGS. 1 and 2) or an independent toy (i.e., detached from lash 26) for solo use by pet 24 (FIG. 5). To accomplish this, lash attachment device 62 is affixed to dangling end 36 of lash 26 (FIGS. 6 and 9) and toy attachment device 64 is affixed to (within) toy 28 (FIGS. 8 and 9). Attachment devices 62 and 64 detachably couple to each other, thereby detachably coupling toy 28 to lash 26.

In the preferred embodiment, toy 28 (FIGS. 7, 8, and 9) is constructed as a pouch 68 or to have a pouch 68. The Figures demonstrate toy 28 in the shape of a mouse, but those skilled in the art will appreciate that the shape of toy 28 is not a requirement of the present invention and that any desired shape may be used. Desirably, the construction of toy 28 is substantially similar to the construction of the apparatus of the patent hereinbefore referenced in the RELATED PATENTS section. Those skilled in the art will appreciate, however, that other types of construction may be used for toy 28 without departing from the spirit of the present invention.

When formed as or to include pouch 68, toy 28 has opening 66. Desirably, toy attachment device 64 is located within opening 66, hence within pouch 68 and the body of toy 28. Therefore, when lash attachment device 62 is attached to toy attachment device 64, both lash attachment device 62 and toy attachment device 64 are concealed within the body of toy 28. This inhibits the detachment of attachment devices 62 and 64 during play, as well as improves the appearance and esthetics of pet-play apparatus 20.

It is desirable that attachment devices 62 and 64 be made of flexible and substantially non-metallic materials. Additionally, it is desirable that attachment devices 62 and 64 not have hard parts, which may be either detached or broken into sharp fragments and ingested during play, i.e., by biting or chewing.

In the preferred embodiment, attachment devices 62 and 64 are desirably flexible fabric-backed hook-and-loop fasteners, such as VELCRO. Each attachment device 62 or 64 includes opposing pieces of flexible fabric tape, one having a front surface with a dense arrangement of tiny polymeric hooks and the other having a front surface with a dense polymeric pile, that interlock when pressed together. The back surface of each piece of fabric is substantially smooth.

Lash attachment device 62 is desirably affixed to dangling end 36 of lash 26 so that the back surfaces of a hook part 70 and a loop part 72 of attachment device 62 are proximate and substantially parallel. That is, the front surfaces (the hooks and the loops) face outward in substantially opposite directions. Lash attachment device 62 therefore forms a hook-and-loop tab 74 at dangling end 36 of lash 26 (FIG. 6).

Toy attachment device 64 is desirably affixed to inner edges 76 of opening 66 of toy 28 so that the back surface of a hook part 78 of attachment device 64 is affixed to one inner edge 76 and the back surface of a loop part 80 of attachment device 64 is affixed to another inner edge 76 with hook part 78 facing loop part 80. Toy attachment device 64, in conjunction with opening 66, therefore forms a hook-and-loop slot 82 in toy 28 (FIG. 8).

With this arrangement, toy 28 may be coupled to lash 26 as a suspended toy by inserting tab 74 into slot 82 and closing opening 66 so that lash hook part 70 engages toy loop part 80 and lash loop part 72 engages toy hook part 78. Similarly, toy 28 may be used as an independent toy by closing opening 66, without inserting tab 74, so that toy hook part 78 engages toy loop part 80.

Those skilled in the art will appreciate that, while not a requirement of the present invention, stuffing 84, such as a catnip cachet or a noise-making device, may be inserted into pouch 68 through opening 66. Stuffing 84 serves to increase the bulk of toy 28 and/or provide olfactory or auditory stimulation to increase the attractiveness of toy 28 to pet 24. The use of stuffing 84 does not depart from the spirit of the present invention.

Figure 10:
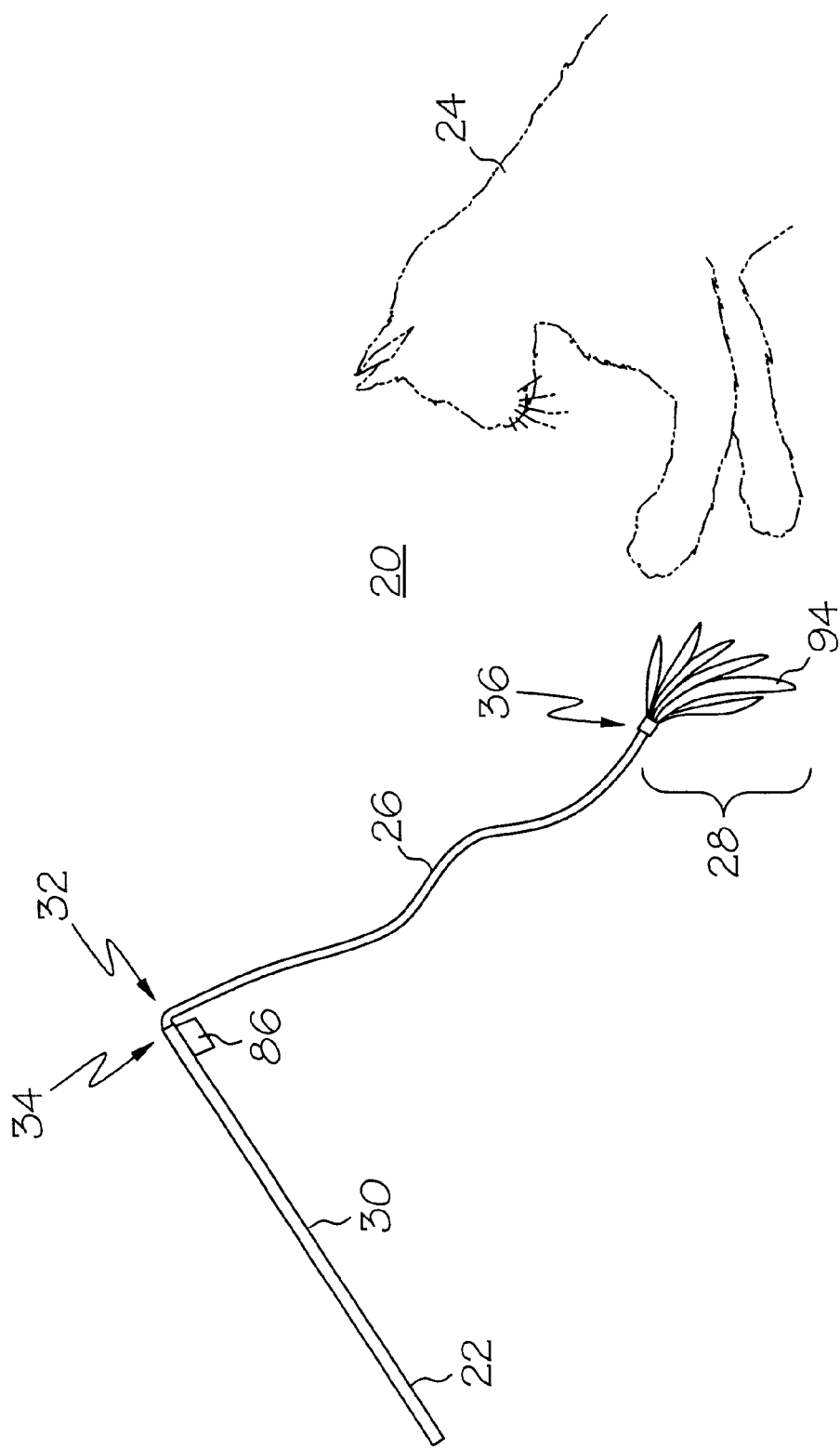
FIG. 10 depicts a pet-play apparatus having a "bird" toy with a sonic device affixed to a crop in accordance with an alternative preferred embodiment of the present invention.
Figure 11:
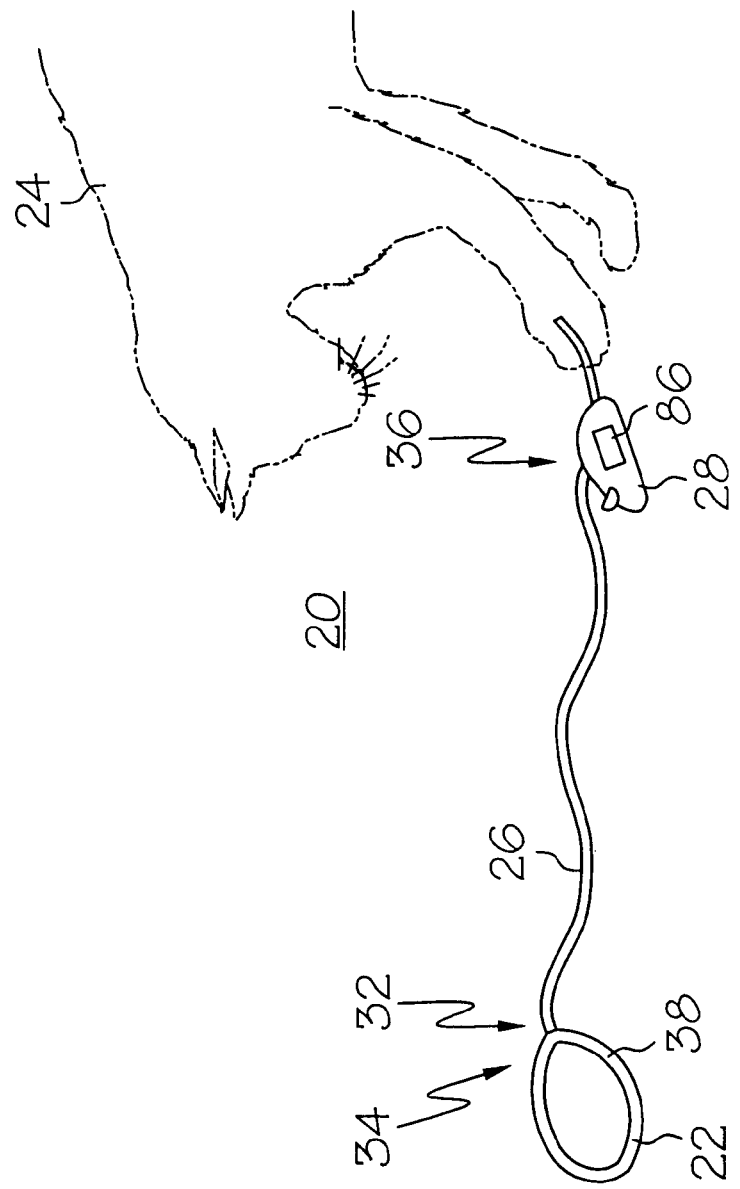
FIG. 11 depicts a pet-play apparatus having a "mouse" toy with a sonic device contained therein in accordance with an alternative preferred embodiment of the present invention.

FIGS. 10 and 11 depict pet-play apparatus 20 incorporating a sonic device 86. Sonic device 86 may be affixed to crop 22 (FIG. 10), or may be located within toy 28 (FIG. 12) in accordance with alternative preferred embodiments of the present invention. The following discussion refers to FIGS. 10 and 11.

To provide additional stimulation of pet 24, it is advantageous to incorporate sonic device 86 into the design of pet-play apparatus 20. Sonic device 86 may be any device known to one skilled in the art that produces sounds that entice or otherwise attract pet 24 to play with apparatus 20.

Preferably, the sound emitted by sonic device 86 is a prey-sound for pet 24. In the preferred embodiment, pet 24 is a domestic cat. The sound is then a relatively quick sound, less than one second in duration. For example, the sound might be a chirp or a squeak, thereby emulating to the cat (pet 24) the sound of a bird or a mouse, its natural prey. One skilled in the art will appreciate that other sounds may be used to stimulate play, particularly with other animals as pet 24.

Desirably, sonic device 86 is an electronic circuit containing a piezoelectric element configured to produce the sound when subjected to motion. In the preferred embodiment of FIG. 10, crop 22 is wand 30 and toy 28 is a "bird," i.e., toy 28 is a small solid toy with at least one feather 94, either real or synthetic, or like object, thereby suggesting a bird to pet 24. Sonic device 86 is affixed to crop 22. A movement of crop 22 causes sonic device 86 to emit the sound.

In the preferred embodiment of FIG. 11, crop 22 is loop 38 and toy 28 is a "mouse" (i.e., toy 28 is a small stuffed toy shaped to suggest a mouse to pet 24). Sonic device 86 is located inside toy 28. A movement of toy 28 causes sonic device 86 to emit the sound.

Those skilled in the art will appreciate that the components of FIGS. 10 and 11 are interchangeable. That is, crop 22 may be configured as either wand 30 or loop 38, toy 28 may be implemented as either a "bird" or a "mouse," and sonic device 86 may be either affixed to crop 22 or located within or affixed to toy 28, in any combination, without departing from the spirit of the present invention.

The following discussion refers to FIGS. 5 through 9 and 11.

The type of detachable coupling discussed hereinbefore in connection with FIGS. 6 through 9 suggests a toy 28 implemented as a "mouse." Such a toy 28 is suitable for solo play (FIG. 5). It will be understood that sonic device 86 may be incorporated into toy 28 when implemented as a "mouse," as demonstrated in FIG. 11. When so incorporated, sonic device 86 may be buried within stuffing 84 of FIG. 9 (sonic device 86 is not shown in FIG. 9).

Figure 12:
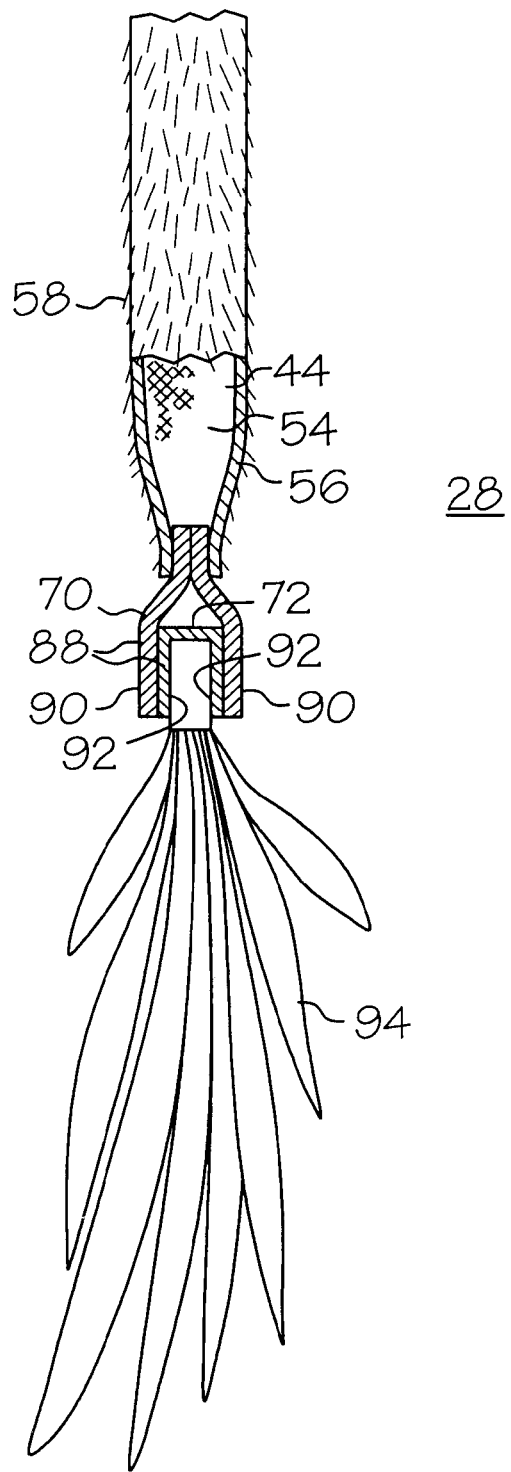
FIG. 12 depicts a portion of a pet-play apparatus demonstrating attachment of a toy to a lash in accordance with an alternative preferred embodiment of the present invention.

FIG. 12 depicts a portion of pet-play apparatus 20 demonstrating an attachment of toy 28 to lash 26 in accordance with an alternative preferred embodiment of the present invention. The following discussion refers to FIGS. 8, 10 and 12.

Alternatively, toy 28 may be implemented as a "bird." In its simplest form, a "bird" is a collection of feathers 94 or similar objects bound together. It has no "inside" into which sonic device 86 may be placed. Since it is not desirous that sonic device 86 or any other hard thing be on or at toy 28 where it may strike and/or startle pet 24, the use of the "bird" implementation of toy 28 typically results in the attachment of sonic device 86 to crop 22.

When implemented as a "bird," toy 28 has no inside, and therefore no opening 66, with associated hook-and-loop slot 82 (see "mouse" embodiment of toy 28 in FIG. 8). The arrangement and placement of attachment devices 62 and 64 would therefore be slightly different than that used for a "mouse" implementation of toy 28.

In the preferred embodiment of FIG. 12, first attachment device 62 incorporates hook part 70, and second attachment device 64 incorporates loop part 72. It will be appreciated by one of ordinary skill in the art that first attachment device 62 may incorporate loop part 72 and second attachment device 64 may incorporate hook part 70 without departing from the spirit of the present invention.

While not a requirement of the present invention, hook and loop parts 70 and 72, as demonstrated in FIG. 12, are bipartite. That is, hook part 70 is a folded strip, the center of which is sewn or otherwise affixed inside tube 42 of lash 26, thereby forming two hook tabs 90. Correspondingly, loop part 72 is a strip folded over and affixed around an end of toy 28, thereby forming two loop tabs 92. Each of hook tabs 90 mates with (i.e., detachably couples to) a corresponding loop tab 92. This provides a strong yet detachable coupling between toy 28 and lash 26.

It is not a requirement of the present invention that hook part 70 and loop part 72 be bipartite, i.e., be formed into two hook tabs 90 and two loop tabs 92, respectively. Hook and loop parts 70 and 72 from two different hook-and-loop fasteners 88 may form individual hook and loop tabs 90 and 92. First attachment device 62 may have either hook or loop tab 90 or 92 formed from hook or loop part 70 or 72, respectively, of a first hook-and-loop fastener 88, and either hook or loop tab 90 or 92 formed from hook or loop part 70 or 72, respectively, of a second hook-and-loop fastener 88, with second attachment device 64 having the corresponding mating parts. Those of ordinary skill in the art will appreciate that the use of any combination of hook and loop parts 70 and 72 does not depart from the spirit of the present invention.

In summary, the present invention teaches pet-play apparatus 20 configured for interactive use with pet 86. Pet-play apparatus 20 has sonic device 86 to stimulate use of apparatus 20, wherein sonic device 86 emits prey-sounds for pet 24 in response to movement of sonic device 86. Pet-play apparatus 20 has a detachable toy 28 and a lash 26 made of a fabric strip 40 desirably formed into a tube 42.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A pet-play apparatus for interactive use with a pet, said apparatus comprising:
   a crop;
   a piezoelectric sonic device coupled to said crop;
   a lash having a first end affixed to said crop and a second end; and
   a toy coupled to said second end of said lash.

2. An apparatus as claimed in claim 1 wherein said crop is configured as one of a wand and a loop.

3. An apparatus as claimed in claim 1 wherein said sonic device is configured to produce a sound in response to a movement of said crop.

4. An apparatus as claimed in claim 3 wherein:
   said pet is a domestic cat; and
   said sound is a prey-sound for said domestic cat.

5. An apparatus as claimed in claim 4 wherein said sound is one of a chirp and a squeak.

6. An apparatus as claimed in claim 3 wherein said sound is less than one second in duration.

7. An apparatus as claimed in claim 1 wherein said lash comprises a strip of fabric having a width and a length greater than said width.

8. An apparatus as claimed in claim 7 wherein said fabric is configured as a tube of said fabric.

9. An apparatus as claimed in claim 7 wherein said fabric is a fake fur configured as a tube of said fake fur having a nap upon an external surface of said tube.

10. An apparatus as claimed in claim 1 additionally comprising:
    a first attachment device affixed to said second end of said lash; and
    a second attachment device affixed to said toy and detachably coupled to said first attachment device.

11. A pet-play apparatus for interactive use with a pet, said pet-play apparatus comprising:
    a lash having a first end and a second end;
    a crop affixed to said first end of said lash;
    a piezoelectric sonic device coupled to said crop;
    a first attachment device affixed to said second end of said lash and comprising a first part of a hook-and-loop fastener;
    a second attachment device detachably coupled to said first attachment device and comprising a second part of said hook-and-loop fastener; and
    a toy affixed to said second attachment device.

12. An apparatus as claimed in claim 11 wherein said sonic device is configured to produce a sound in response to movement thereof.

13. An apparatus as claimed in claim 12 wherein:
    said pet is a domestic cat; and
    said sound is a prey-sound for said cat.

14. An apparatus as claimed in claim 11 wherein said toy comprises at least one feather.

15. An apparatus as claimed in claim 11 wherein said toy is detachably coupled to said second end of said lash.

16. An apparatus as claimed in claim 11 wherein said lash comprises a strip of fabric formed into a tube having a diameter and a length greater than said diameter.

17. A pet-play apparatus for interactive use with a pet, said pet-play apparatus comprising:
    a lash having a first end and a second end;
    a crop affixed to said first end of said lash;
    a first attachment device affixed to said second end of said lash and comprising:
        a first part of a first hook-and-loop fastener; and
        a first part of a second hook-and-loop fastener;
        a second attachment device detachably coupled to said first attachment device and comprising:
        a second part of said first hook-and-loop fastener; and
        a second part of said second hook-and-loop fastener; and
    a toy affixed to said second attachment device.

18. An apparatus as claimed in claim 17 wherein:
    said first parts of each of said first and second hook-and-loop fasteners are hook parts thereof; and
    said second parts of each of said first and second hook-and-loop fasteners are loop parts thereof.

* * * * *